United States Patent [19]

Sasser

[11] Patent Number: 4,677,639
[45] Date of Patent: Jun. 30, 1987

[54] LASER DEVICE

[75] Inventor: Thurman Sasser, Orlando, Fla.

[73] Assignee: Laser Photonics, Inc., Orlando, Fla.

[21] Appl. No.: 142,858

[22] Filed: Apr. 21, 1980

Related U.S. Application Data

[63] Continuation of Ser. No. 859,472, Dec. 12, 1977, abandoned.

[51] Int. Cl.$^4$ .............................................. H01S 3/081
[52] U.S. Cl. ..................................... 372/93; 372/100; 372/107; 372/108
[58] Field of Search ...................... 331/94.5 C, 94.5 D

[56] References Cited

U.S. PATENT DOCUMENTS

3,995,230 11/1976 See .................................. 331/94.5 C
4,050,035 9/1977 Wuerker et al. ................. 331/94.5 C
4,099,141 7/1978 Leblanc et al. .................. 331/94.5 C

Primary Examiner—Leon Scott, Jr.
Attorney, Agent, or Firm—Duckworth, Allen, Dyer

[57] ABSTRACT

A laser device having an improved resonator utilizes a single rigid base component for a light reflector coating that defines and forms the end terminals of the resonator cavity, means being provided for translating and reflecting the laser beam between linear light paths that respectively terminate at the mirror surfaces provided by the coating. Various embodiments are shown and in which one or more prisms are used to fold the laser beam between offset and parallel light paths. The end terminal forming mirror surfaces may be coplanar and face in a common direction in the base component, or the mirror surfaces may be provided on opposite side surfaces of the component. Where the base component is made from transparent material the terminals may also be defined by the inside and outside surfaces of the coating. The use of figured surfaces in the unitary structure is contemplated and the use of mirror clusters for folding the beam is also contemplated. The rigid base component may be provided by a prism, a solid state laser rod, the envelope for a fluid lasing medium or any suitable rigid unitary structure that has an appropriate surfaces arrangement for the contemplated use.

42 Claims, 14 Drawing Figures

LASER DEVICE

This is a continuation of application Ser. No. 859,472, filed Dec. 12, 1977 now abandoned.

BACKGROUND OF THE INVENTION

The invention relates to laser devices and more particularly to laser devices with improved optical resonators.

Laser devices utilize a lasing medium and some means for pumping energy into the medium to produce an electron population inversion that initiates the lasing action. To propagate a laser beam and to control superradiant lasing, the medium is arranged in an optical cavity or light path of the resonator so that the photon or light beams produced along the path through the medium are propagated back and forth between the terminal ends of the cavity. This propagation causes the laser beam to grow in magnitude with each traverse of the cavity.

The terminal ends of the cavity are conventionally formed and defined by a pair of optically reflective mirror components. These components must be critically aligned at each end of the cavity so as to reflect the incident light 180°, and thus back along the path of incidence at each reflective surface. In many cases the cavity or light path for the beam is linear and the mirror components are aligned and arranged at the opposite ends of the linear light path with the lasing medium being arranged along the light path between the optical reflectors. This arrangement necessitates a space separation of the reflective components and the provision of a rigid frame or comparable structure on which the reflectors must be securely mounted and properly aligned. Such structures expand and contract with temperature changes and are subject to various physical disturbances, the problems of maintaining alignment being recognized in the art. The solutions to date, however, have entailed the use of complicated and expensive equipment to facilitate the adjustments needed to attain and maintain proper alignment of the cavity terminating components.

To conserve space and/or overcome reflector misalignments caused by physical disturbances, the art has resorted, in some applications, to the use of optical resonators that provide for the lateral translation of the beam between the path through the lasing medium and one which is parallel and laterally offset therefrom. Under some circumstances, the terminating mirrors of the resonator are two separate components that are proximally located and thus subject to similar environmental conditions that tend at least to minimize disturbances arising from temperature differences. The need for special mountings to obtain proper alignment still prevails, however, because of the use of separate reflective components at the end terminals of the cavity which must be individually aligned to accomplish their intended function. There is, accordingly, a need for improved optical resonators which avoid or minimize such alignment problems.

STATEMENT OF THE INVENTION

The invention relates to laser devices and more particularly to laser devices with improved optical resonators.

The inventor has found that the problems of aligning the mirrors or reflectors at the end terminals of the cavity can be substantially eliminated if the mirror or light reflective surfaces that form and define the end terminals are embodied and fixed to the surfaces of a single rigid structural component and if provisions are made for translating and reflecting the laser beam between linear light paths that terminate at the mirror surfaces.

The means for laterally translating and reflecting the laser beam along the separate light paths may be accomplished by any suitable optical system utilizing prisms and/or mirrors for folding the beam between the separate light paths. In the preferred practice of the invention, the translation and reflection is accomplished by one or more components that are provided with orthagonally arranged reflective surfaces, such as embodied in the well known corner prisms or in comparable mirror cluster arrangements that provide for three orthagonally arranged light reflective plane surfaces. The corner prisms have three mutually perpendicular plane surfaces and a fourth plane surface which forms the face of the prism and is obliquely arranged with respect to the other three surfaces. Such prisms are commonly referred to as "corner", "trihedral" and "cat's eye" reflectors. Such prisms and the mirror clusters formed by three mutually perpendicular plane optically reflective surfaces characteristically provide a reflected beam that is parallel to the incident beam over substantial variations in the angle of incidence to any of the mutually perpendicular planes. Apart from the use of corner prisms, offset and parallel light paths may also be attained through the use of porro or roof top prisms and comparable mirror cluster arrangements.

In the preferred embodiment of the invention, the optical resonator has a single corner prism that is arranged in the linear light path through the lasing medium and with its axis of symmetry offset from the path through the medium so that the beam is laterally translated and reflected between the path through the medium and a second linear path which is offset and in parallel therewith. Under such circumstances the end terminals of the cavity are formed and defined by a pair of flat reflective surfaces that are relatively fixed and provided by suitable coating means that is fixed to the base component. These reflective surfaces are arranged in the respective light paths so as to reflect the incident beam light at each surface back along the path of incidence thereto. The arrangement has the advantage that substantial relative motion between the translating component and the base structure for the mirror surfaces can be tolerated without affecting the laser performance since light incident to the prism face over substantial variations in the angle of incidence is always reflected back along a parallel path.

The rigid unitary structure forming the base structure for the terminal mirrors may be provided in the resonator in several different ways. In some solid state laser applications, the laser rod may provide the base structure for the mirror surface forming coating. Similarly, in some gas laser applications, the envelope for the lasing medium may be used as the mirror base structure. In other applications, a prism may serve as the base structure, while in yet other instances a rigid unitary structure having the desired surface arrangement may take the form of a simple component that is separate and apart from the means for developing the laser beam or structure used in translating or reflecting the beams.

In many applications of the invention, a simple mirror having a flat planar surface that is provided with a continuous uninterrupted coating of light reflecting material may be utilized to provide the end terminal defining and forming mirror surfaces of the resonator. In still other applications, a simple flat mirror with oppositely facing surfaces that are suitably coated with reflective material may be utilized to provide the terminal mirrors of the resonator. Furthermore, figured convex and/or concave surfaces may also be embodied in the base component for the mirror surfaces. Such reflective surfaces may, of course, be parabolic, or segmented elliptical or spherical surfaces, as will be apparent to those skilled in the art.

In accord with certain aspects of the invention, the optical resonator may be provided with a pair of light translating and reflective components that are respectively located at the opposite ends of a light path through the lasing medium. Under such circumstances, the translating components are used to fold the laser beam into light paths that are preferably offset and in parallel with the path through the lasing medium. The mirror base component, in such cases, is preferably provided with oppositely facing and preferably flat parallel reflective surfaces and the component is so positioned as to reflect the incident light traversing the offset paths back toward the translating components. Under such circumstances, the use of corner prisms and/or mirror clusters with three orthogonally arranged plane reflective surfaces are preferred because of the alignment tolerances permissible through the use of such arrangements. However, other optical means, such as a pair of appropriately arranged porro or roof top prisms for translating the beam between parallel light paths may also be used.

The invention is based upon the use of a single unitary structural component as the base structure for the light reflective coating or coatings which form and define the opposite end terminals of the laser resonator, and in practice, provisions are made for translating and reflecting the laser beam between linear light paths which terminate at the reflective surfaces provided on the component.

A general object of the invention is to provide improved laser devices which minimize the problems heretofor encountered in maintaining the alignment of the end terminal reflectors for the optical resonators of such devices. Yet another objective of the invention is to provide improved optical resonators for laser devices which are simpler and less costly to manufacture. Still another object of the invention is to provide improved optical resonators for laser devices which will tolerate substantial relative movement of the resonator components without substantial interference with the laser performance. Yet another objective of the invention is to provide improved optical resonator cavities for laser devices which avoid the need for precise inititial alignment of the resonator components.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, in which:

DESCRIPTION OF THE EMBODIMENTS

Reference is now made to FIGS. 1-4 and wherein the invention is seen as embodied in a laser device 10 of the type having a pulsed laser beam output 11. The laser device includes an elongated generally rectangular box-type housing 12 for an optical resonator 13 that utilizes an elongated cylindrical ruby rod 14 as the lasing medium source. The device also includes a means for pumping energy into the lasing material and which is shown in the form of an elongated xenon flashlamp 15.

The optical cavity or resonator light path 16 in the illustrated embodiment includes horizontally extending parallel linear light paths 17 and 18 that are laterally offset and interconnected by a light path 57 within the prism component of the resonator. The opposite end terminals 19 and 20 of the cavity 16 are formed and defined by flat planar mirror surfaces 21 and 22 that are formed by means of coatings 21a and 22a which are fixed to the exterior surface 23a of a rigid unitary component 23 that provides the base support structure for the mirror coatings. The laser rod 14 is mounted with its longitudinal axis 24 in a coaxial arrangement with light path 17 so that the photon beams produced along the rod axis may be propagated in the cavity 16. The laser beam 50 produced by the lasing action is translated and reflected between the light paths 17 and 18 by means of a corner prism 25 that is arranged at the prisms ends 26 and 27 of the light paths 17 and 18. These path ends 26 and 27 are opposite the respective terminal ends 19 and 20 of the cavity.

The device also includes, in the illustrated embodiment, a dielectric polarizer 28 which is mounted in path 18 and a Q-switch which is shown in the form of a pockels cell 29 that is also mounted in the path 18. These components 28 and 29 are supported in path 18 by rigid supports (not shown) but which are securely mounted on the bottom wall 31 of housing 12. The components 28 and 29 are conventional components used in laser applications and which cooperate in providing a pulse output 11 when the pockels cell is subjected to successive applications of a D-C voltage as through leads 30.

The housing includes opposite side walls 32 and 33, opposite end walls 34 and 35, and an open top wall 36 in addition to the bottom wall 31 of the resonator enclosing structure. At one end 50 of the housing, the housing in internally equipped with a form fitting mount 37 for the corner prism 25 and which is integral with the bottom wall and adjacent end wall 34. The mounting 37 has an upright section 38 which confronts a center portion of the prism face 39 between the paths 17 and 18. It serves to maintain the planar facial surface portion 39 of the prism substantially in parallel with the inside planar surface portion 51 of the mirror base 23 at the other end 41 of the housing, and thus also in parallel with the mirror surfaces 21 and 22.

Generally intermediate the opposite side walls 32 and 33 and located adjacent end wall 35, the housing is internally equipped with an upright rigid mounting block 42 for the base component 23 for the mirrors. Block 42 is integrally formed with the bottom wall of the housing and has a transversely extending vertical slot 43 in which the base component 23 is fixed. As thus fixed, the mirror surfaces 21 and 22 that form and define the end terminals 19 and 20 are laterally offset from the mount 42 and arranged in the light paths 17 and 18.

Figure 2:
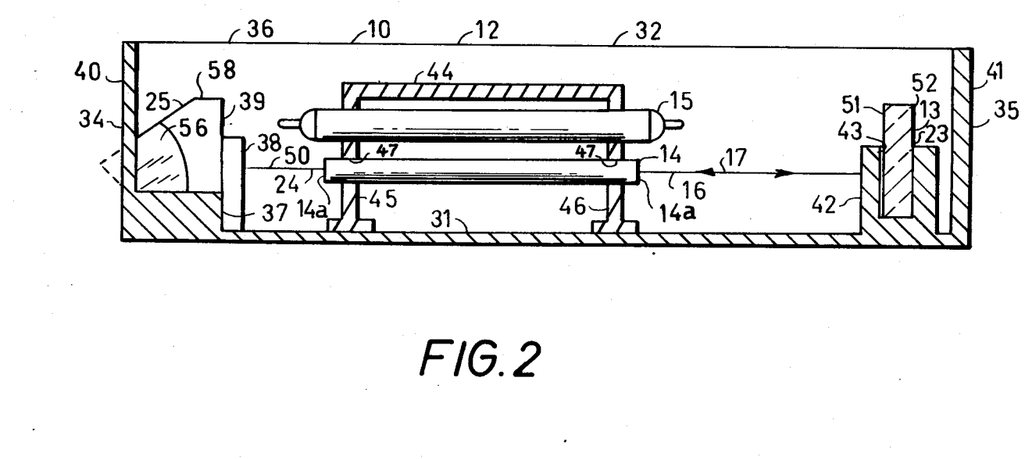
FIG. 2 is a vertical sectional view as seen along the lines 2—2 of FIG. 1.

The flashlamp 15 and laser rod 14 are mounted on an inverted rigid U-shaped support 44 that is fixed to the bottom wall 31 and located adjacent side wall 32. Support 44 has spaced apart upright legs 45 and 46 with appropriate horizontally aligned apertures for their mounted positions. These components 15 and 16 of the device are vertically spaced apart on support 44 and horizontally arranged in parallel as seen in FIG. 2. The laser beam 50, under such circumstances, passes through the aligned leg apertures 47 for rod 14 as it traverses the path 17 through the rod.

The mirror base component 23 of the resonator is generally rectangular in the illustrated embodiment and preferably made of fused quartz material because of its low temperature coefficient of expansion as well as the desire, in the illustrated embodiment, for transparency to facilitate the transmission of the laser output 11. The oppositely facing surface portions 51 and 52 of the flat base component 23 are plane parallel surfaces and the mirror surfaces and the mirror surfaces 21 and 22 that form and define the end terminals of the cavity are embodied and fixed on the inside facing planar surface portion 51 so as to provide a coplaner arrangement of the mirror surfaces and facilitate a generally parallel arrangement with the face 39 of prism 25. The mirror surfaces 21 and 22 may be formed from any suitable coating material providing the desired reflectivity. Coating 21a may be formed from conventional dielectric coating materials that provide a maximum reflectance and coating 22a may be formed from conventional dielectric material providing a lesser reflectance at surface 22 so that a portion of the light incident to the latter surface 22 may be transmitted through the base as the output beam 11. Typically, the coating 22a may provide 60% reflectance of the incident light at surface 22 so that a portion of the incident light impinging on the surface 22 passes through the quartz base component and then through the aligned aperture 53 in end wall 35 to provide the laser output beam 11.

The mirror surfaces 21 and 22 on the quartz structure 23 are spaced apart and face in a common direction toward the prism face so that incident beam light impinging on each surface is reflected 180° and thus back along the path of incidence at the terminal mirror.

Figure 3:
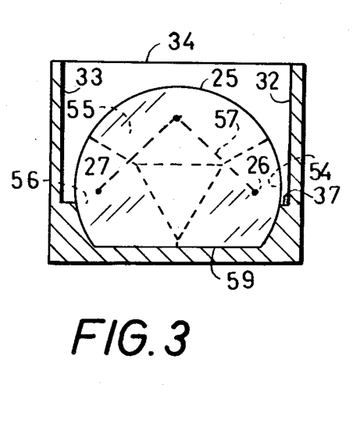
FIG. 3 is a transverse sectional view as seen generally along the lines 3—3 of FIG. 1.
Figure 4:
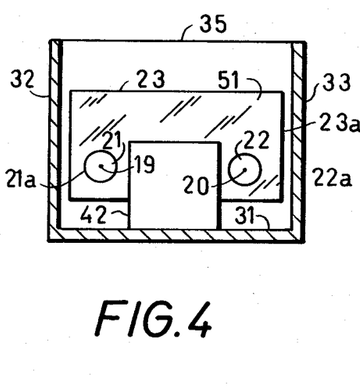
FIG. 4 is another transverse sectional view taken generally along the lines 4—4 of FIG. 1.

The corner prism 25 in the illustrated embodiment is formed from a cylindrical quartz component 58 that is provided with three orthagonally arranged reflective surfaces 54, 55, and 56. The components 58 is truncated and, as seen in FIG. 3, has a flat surface 59 that is normal to the facial surface 39 and in parallel with the axis 48 through the apex 49 of the component, the arrangement being provided to facilitate the mounting of the prism in mount 37. As thus arranged in the resonator, the axis 48 of the prism is generally normal to the flat face 51 of the base component 23 so that surfaces 39 and 51 of the resonator components 25 and 23 are generally parallel. However, substantial deviation in the parallel arrangement can be tolerated because of the optical nature of the prism and which translates and reflects the incident light along parallel paths.

Figure 1:
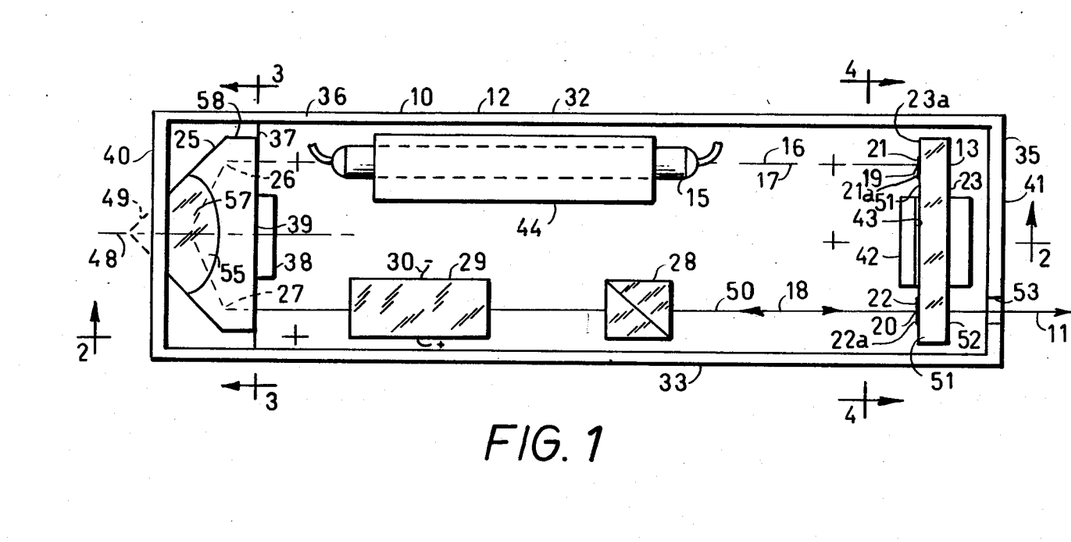
FIG. 1 is a top plan view of a laser device embodying certain aspects of the invention.

In normal operation of the laser device 10, the flashlamp 15 is initially energized so as to provide a means for pumping energy into the lasing medium of rod 14. When an electron population inversion is attained, a lasing action transpires and the photon or light beams produced in the medium along the rod axis 24 are propagated back and forth between the end terminals 19 and 20. At end terminal 19 the incident beam light along path 17 is normal to the plane surface 51 and upon impinging upon surface 21 is reflected back along the path 17 of incidence thereto. At the opposite ends of rod 14, the rod is equipped with planar end surface portions 14a that are normal to the path 17 to avoid light refraction in the illustrated embodiment. However, to avoid the resulting etalon effect at the rod ends, conventional wedging practices may be followed as will be apparent to those skilled in the art. In transversing the rod along path 17, the reflected beam light further stimulates photon beam emission as is well known. At the prism end 26 of path 17, the incident light beam 50 passes through the prism face 39 and encounters the orthogonally arranged reflective surface 54 of prism 25 and is thereby reflected along the path 57 of translation between paths 17 and 18 as best seen in FIGS. 1 and 3. In traversing the path 57, the light reflected by surface 54 thereafter impinges upon the orthogonal surfaces 55 and 56. At surface 56 the translated beam light is reflected into path 18 and emerges from the prism 25 through the prism face 39. The end surfaces of components 29 and 28 are normal to the path 18 to avoid nonlinearity in path 18 and after traversing the pockels cell 29 and polarizer 28, the beam light impinges upon mirror surface 22. Here a portion of the beam light incident to the surface 22 is reflected back along the path 18 while the balance of the incident light passes through the coating 22a and component 23 and thence, through aperture 53 to provide the laser output 11. The beam light reflected by the terminal forming surface 22, of course, then retraces the paths 18, 57, and 17 to the other terminal end 19 of the cavity and is again reflected so that further photon beam emission is stimulated during each traverse of the rod 14.

The Q-switching function of the Pockels cell 29 is deemed obvious to those skilled in the art. Briefly, however, the cell 29 is subjected to a pulsating D-C voltage that successively activates the cell so that the beam propagation is periodically interrupted when the cell is activated. During the activated period, pumping continues and the inversion builds up to be released during the intervals of voltage removal from the cell so that the output is concentrated in short pulsating burts of coherent light.

Reference is now made to the embodiment shown in FIGS. 5-8 and wherein the invention is seen as embodied in a laser device 60 of the type having a continuous beam output 61. The device 60 is quite similar in structure to the device illustrated in the previous embodiment with provisions, however, being made for a generally lateral and continuous beam output 61. Again, the device includes an elongated generally rectangular housing 62 for the optical resonator 63. The resonator 63 utilizes an elongated cylindrical YAG rod 64 as a source of lasing medium and an elongated cylindrical krypton lamp 65 as the means for pumping energy into the lasing medium.

The resonator path or optical cavity 66 again has horizontally extending linear light paths 67 and 68a which terminate at the end terminals 69 and 70 and are parallel and laterally offset as seen in the drawings. The end terminals 69 and 70 of the cavity 66 are formed and defined by mirror surfaces 71 and 72 that are embodied in another rigid unitary quartz component 73 that forms the base structure for mirror coatings 71a and 72a. The longitudinal axis 74 of the laser rod 64 is coaxially arranged with light path 67 to again facilitate propagation of the photon beams which are produced in the medium along the rod axis. The beam 98 developed by the lasing action is translated and reflected between parallel light paths 67 and 68a by means of another corner prism 75 which is structurally identical to that described in the previous embodiment and by means of a quartz component 78 that serves as the base for the pick-off mirror coating 79. Prism 75 is arranged at the prism ends 76 and 77 of the paths 67 and 68. The opposite ends of the path 67 are designated at 76 and 69, whereas the opposite ends of the path 68 are designated at 77 and 77a respectively.

At path end 77a, the laser device is provided with a flat, transparent and rectangular quartz component 78 that serves as a mount providing a surface 78a for a suitable dielectric coating 79 which laterally reflects a portion of the light through an aperture 80 in the housing side wall 81 to thus provide the output beam 61. The balance of the light incident to the coated surface 78a is transmitted by the transparent component 78 and due to refraction is translated to emerge from component 78 at the opposite surface 78b along the path 68a. Path 68a is offset from path 68 but nevertheless parallel to both paths 67 and 68.

As in the arrangement shown in the previous embodiment, the housing 62 has opposite side walls 81 and 82, opposite end walls 84 and 85, and an open top wall 86 in addition to the bottom wall 83 of the structure. At one end 87 of the housing, the housing is internally equipped adjacent end wall 84 with a form fitting mount 88 for the corner prism 75. Mount 88 includes an upright section 89 that confronts a center portion of the plane facial surface portion 90 of the prism and which is located between the parallel light paths 67 and 68 for purposes of maintaining a substantially parallel arrangement of the prism face 90 with the inside planar surface portion 99 of the mirror base 73 at the other end 91 of the housing. The laser beam along paths 67 and 68 is accordingly normal to the prism face 90 upon emergence and entry of the prism.

The terminal mirror base component 73 is mounted in a transversely arranged slot 92 in a rigid block 93 and which is formed integral with the bottom wall and generally located adjacent to end wall 85 and intermediate the opposite side walls 81 and 82. The rigid rectangular base component 73 is fixed in the slot 92 and arranged with the end terminal forming and defining mirror surfaces 71 and 72 laterally offset from the block and in the light paths 67 and 68a at the end terminals 69 and 70 of the cavity.

Figure 6:
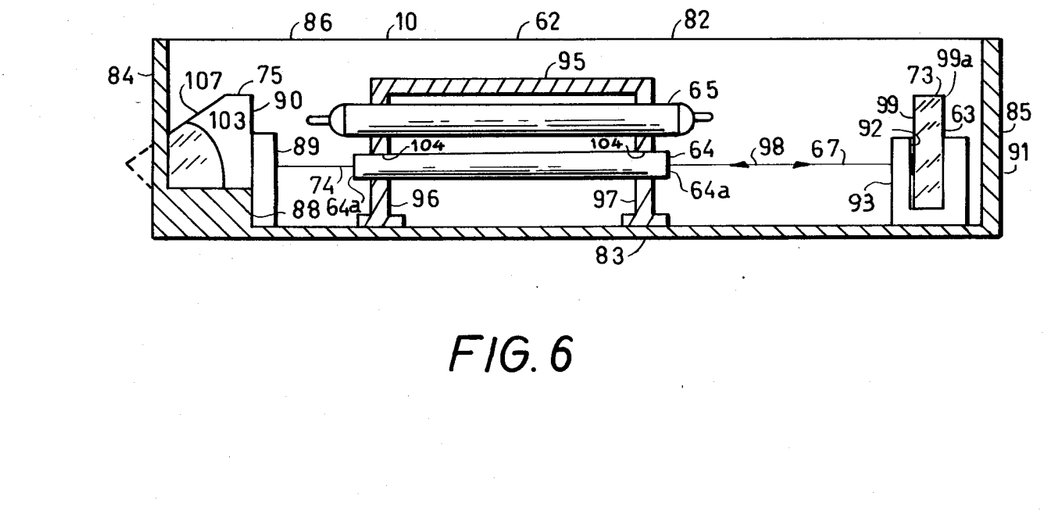
FIG. 6 is a longitudinal vertical section view taken generally along the lines 6—6 of FIG. 5.
Figure 7:
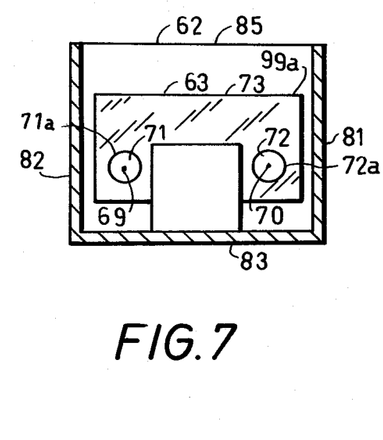
FIG. 7 is a transverse sectional view taken generally along the lines 7—7 of FIG. 5.

The lamp 65 and rod 64 are mounted on another inverted rigid U-shaped component 95 that is fixed to the bottom wall and located adjacent side wall 82. The legs 96 and 97 of the support 95 are spaced apart and are provided with horizontally aligned apertures for receiving the opposite ends of the laser rod and flashlamp in their mounted positions. These components 64 and 65 are also vertically spaced apart and horizontally arranged in parallel as seen in FIG. 6, the arrangement being such that the laser beam 98 passes through the aligned leg apertures 104 in traversing the light path 67 through rod 64. The opposite end plane surface portions 64a of rod 64, are normal to path 67 in the illustration so as to avoid refraction and simplify the structural requirements. Again however, conventional wedging practices may be used to avoid the etalon effects if desired.

The base component 73 is generally rectangular as seen in the drawings, and may be made, in this embodiment, from any suitable opaque or transparent material providing the desired rigidity for the structure. A fused quartz glass material is entirely suitable and preferred however, because of its low temperature coefficient of expansion. The inside facing surface portion 99 of the outer surface 99a of the base 73 is a plane surface, and the mirror surfaces 71 and 72 that define and form the end terminals of the cavity are provided by reflective coatings 71a and 72a that are fixed to the flat surface 99. These coatings may be formed by conventional dielectric coating materials and which, in this embodiment, provide a maximum reflectance at both mirror surfaces 71 and 72. These surfaces 71 and 72 may of course, be provided by a continuous noninterrupted coating that covers the entire surface 99 if desired. The mirror surfaces 71 and 72 face in a common direction toward the prism face, and as such, the incident beam light that falls on the surfaces 71 and 72 is reflected by each surface back along its path of incidence thereto and toward the prism face.

The corner prism 75, like the corner prism in the previous embodiment is made from a cylindrical quartz component 107 that is provided with orthogonally arranged flat plane light reflective surfaces 100, 102 and 103. The component is truncated as seen in the drawings, and also has a flat surface 105 which is parallel with the prism axis through the apex 108 to facilitate the mounting of the structure in the housing. The face 90 of the prism is, of course, perpendicular to the axis 106 and in mounting the component 73, the face 99 of the component is arranged generally normal to the prism axis 106 so that the mirror surfaces 71 and 72 are generally parallel with the face 90 of the prism 75.

Figure 5:
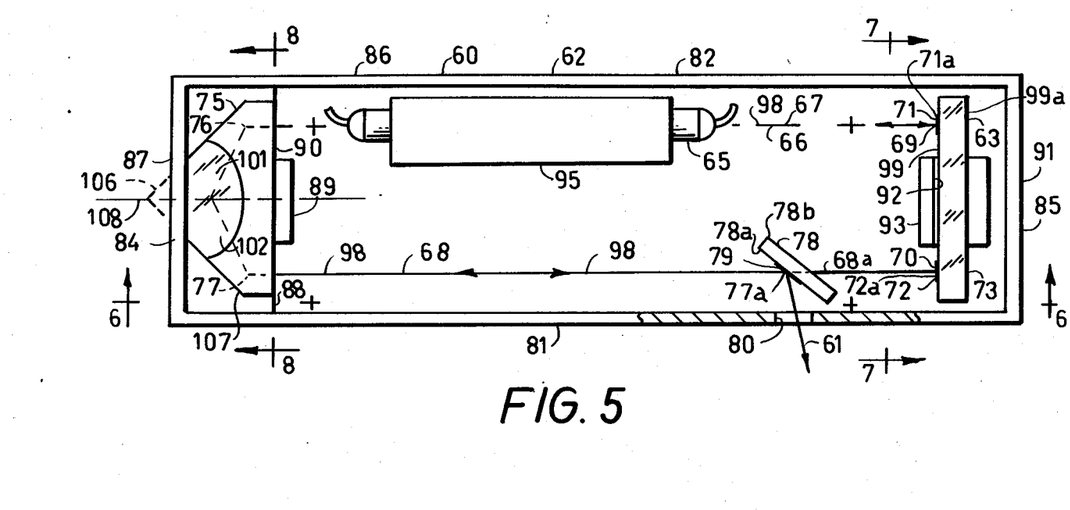
FIG. 5 is a top plan view of yet another laser device embodying certain aspects of the invention, with certain parts being broken away.
Figure 8:
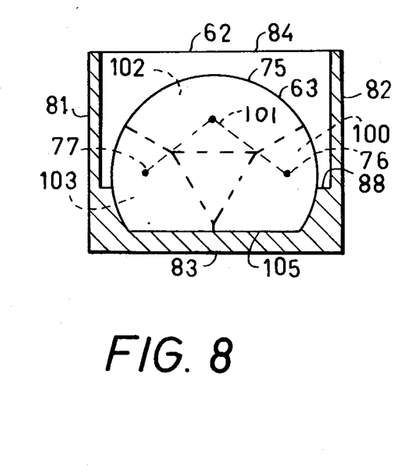
FIG. 8 is another transverse sectional view taken generally along the lines 8—8 of FIG. 5.

When the laser device 60 is rendered operational, the lamp 65 is energized to provide the means for pumping energy into the lasing medium of the rod 64. As the population inversion is attained, the photon or light beams produced in the medium along the rod axis 74 are again propagated back and forth between the end terminals 69 and 70 of the cavity. At terminal 69, the path 67 for the incident beam light is normal to surface 99 and mirror surface 71 so that it is reflected back along the path 67 and through the rod 64 to further stimulate photo beam emission. At the prism end 76 of path 67, the beam enters the face 90 of prism 75 and encounters the reflective surface 100 of the corner prism 75. Here the incident light in path 67 is reflected along the path 101 for translating the beam between paths 67 and 68 as seen in FIGS. 5 and 8. Along this path 101, the beam light impinges upon orthogonally arranged surfaces 102 and 103 and from surface 103 is reflected along the linear light path 68 to emerge through the prism face 90. At end 77a of path 68, a portion of the beam light is laterally reflected as the output 61 by the coating 79. The balance of the light passes through component 78 and is refracted to emerge at surface 78b along path 68a. The translated beam light thereafter impinges upon mirror surface 72. Here, the path 68a is normal to the base surface 99 and surface 72 and hence, the incident light is again reflected back along the path 68a and thereafter retraces the paths 68, 101 and 67 to the other end terminal 69. Again, as the light passes along the path 67 through rod 64, further stimulated emission is, of course, developed.

In this embodiment, the corner prism 75 and component 78 reflect and translate the beam between the offset and parallel paths 67 and 68a that terminate at the planar surface and the base, and the surfaces 71 and 72 of the coatings are arranged to reflect the incident light at the terminal ends 69 and 72 back along the respective paths 67 and 68a.

Figure 9:
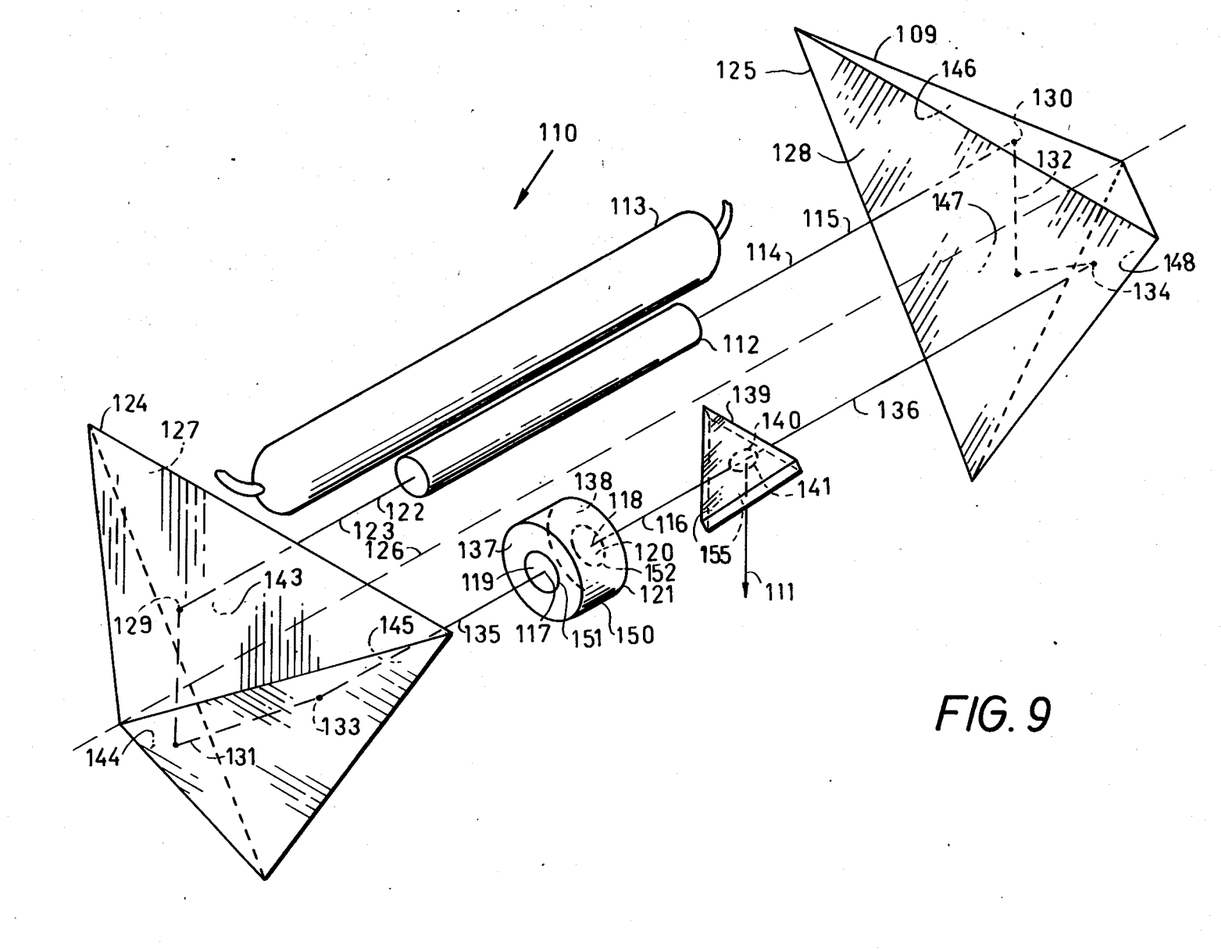
FIG. 9 schematically illustrated another laser device embodying certain principles of the invention.

Reference is now made to FIG. 9 and wherein the invention is schematically illustrated as embodied in yet another laser device 110 of the type having a continuous laser beam output 111. Here the laser beam is translated and reflected by means including a pair of prisms and the end terminal forming and defining surfaces face in opposite directions. The resonator 109 of the laser device includes an elongated laser rod 112 that may again be of the YAG type to provide the lasing medium. A krypton lamp 113 that serves as the means for pumping energy into the lasing medium is provided in the resonator.

The optical cavity or resonator path 114 is this embodiment, has a linear light path 115 that extends through the laser rod 112 and a pair of light paths 135 and 136 that are parallel to path 115 and result from the reflection and translation of the laser beam 123 by means of corner prisms 124 and 125. In addition to paths 115, 135, and 136, the resonator cavity has a linear light path 116 which is also parallel to paths 115, 135 and 136, and which results from the refraction occuring in the transmission of the light through the transparent output beam pick-off component 139.

The end terminals of the cavity are designated at 117 and 118 and, in this instance, are formed and defined by oppositely facing and parallel mirror surfaces 119 and 120 that are embodied in a rigid unitary structural component 121 that provides the base structure for the coatings used in forming the mirror surfaces. The base 121 in this instance is shown in the form of a flat quartz disc component that has an exterior surface 150 which includes oppositely facing planar surface portions 137 and 138. The coatings 151 and 152 are respectively fixed to the oppositely facing planar surfaces 137 and 138, and the light paths 135 and 116 are normal to these surfaces 137 and 138 so that beam light incident to the mirror surfaces 119 and 120 is reflected back along the paths of incidence to the surfaces. The base component 121 is preferably made of quartz material because of its temperature stability. However, other suitable materials, including opaque materials may be used in forming the unitary structure in this application. Again the coatings 151 and 152 may be formed from suitable light reflective coating materials conventionally used in the laser applications and in the embodiment illustrated preferably provide maximum reflectance at each of the surfaces 119 and 120.

Rod 112 is mounted with its longitudinal axis 122 in a coaxial arrangement with the light path 115 so that the photon beams produced along the axis 122 may be propagated between the end terminals 117 and 118 of the cavity 114. The laser beam 123 produced by the lasing action is translated and reflected between paths 115 and 135 by corner prism 124 and traverses a path, designated at 131 during its translation. On the other hand, prism 125 provides a means for reflecting and translating the beam between paths 115 and 136. Here the beam 123 traverses the path designated at 132 in passing between the paths 115 and 136. The corner prisms 124 and 125 are spaced apart as seen in the illustration and are arranged with their axis 126 of symmetry in a coaxial arrangement and parallel to the axis of and light path 115 through rod 112. As thus arranged, the plane facial surface portions 127 and 128 of the corner prisms 124 and 125 are arranged in parallel with each other and with the flat planar surface portions 137 and 138 of the base component 121. The beam pick-off mount is arranged so that light path 116 is parallel to path 136 and consequently light paths 115, 135, 136 and 116 are generally normal to the prism faces and planar surfaces of the mirror component.

In some laser applications, rod 112 may introduce a wedge angle through the use of non-parallel end surfaces so as to avoid the etalon effect. In such cases, compensating wedge components may be used to provide beam outputs at the rod ends which are parallel and normal to the prism faces. In the instant embodiment, however, the rod 112 is provided with plane parallel opposite end surfaces 153 and 154.

In the instant embodiment, the output beam 111 is provided by a suitable coating 140 of dielectric material that is fixed to one of the oppositely facing plane surfaces 155 of the quartz component 139. The dielectric coating material may be any suitable type used for such purposes and serves to laterally reflect a portion of the incident light impinging at the end 141 of path 136 on the outer surface of the coating as the output beam 111. The balance of the light is transmitted and refracted by the component 139 so that the laser beam is translated from path 136 to the offset and parallel path 116 in passing to terminal 118.

The flat orthogonally arranged plane reflective surfaces of prism 124 are designated at 143, 144 and 145. At the prism end 129 of path 115, incident light of the beam 123 that enters the prism face 127 impinges upon surface 143 and is reflected along the path 131 to impinge upon the surfaces 144 and 145. Beam light along path 131 that is incident to surface 145 is reflected along path 135 at path end 133 and thereafter emerges through the prism face 127, to impinge upon the mirror surface 119 defining and forming the terminal end 117 of the cavity.

Here, the incident light impinging on the surface 119 is reflected 180° and thus back along the path 135.

The three orthogonally arranged reflective surfaces of corner prism 125 are designated at 146, 147 and 148. As such, at the other end 130 of path 115 incident light of beam 123 enters the prism 125 through face 128 and is reflected by surface 146 along path 132. Along path 132, the beam light impinges upon surfaces 147 and 148 and the light along path 132 that is incident to surface 148 at path end 134 is reflected along path 136. At the end 141 of path 136 a portion of the light incident to the surface of coating 140 reflected as the output beam 111 while the balance is transmitted through the transparent base component 139 for the coating and emerges from the component along the parallel path 116 to impinge upon the end terminal 118 forming and defining mirror surface 120. Here again, the light incident to surface 120 is reflected 180° and thus back along the path 116 to traverse the paths 136, 132, 115, 131 and 135 to the opposite end terminal 117.

Figure 10:
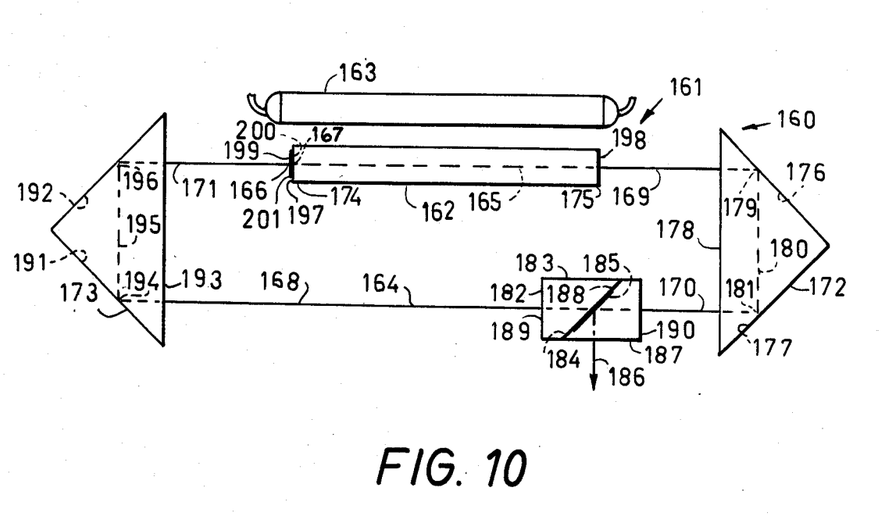
FIG. 10 schematically illustrates another laser device embodying certain principles of the invention and wherein the base component for the terminal mirrors is provided by a solid state laser rod.

FIG. 10 schematically illustrates a laser device embodying principles of the invention and in which a solid state laser rod constitutes the unitary base structure for the cavity and terminal mirrors.

The device 10 has a resonator 161 which includes an elongated cylindrical YAG rod 162 that provides the source of lasing material. It also includes an elongated cylindrical krypton lamp 163 that provides the means for pumping energy into the lasing medium. The laser beam 164 is developed along the axis 165 of the rod and resonates and is propagated back and forth between the end terminals 166 and 167 of the resonator cavity or light path 168.

The beam path 168 includes parallel linear light paths 169 and 170 and a linear light path 171 which is coaxial with path 169 and the rod axis 165 and also laterally offset from path 170. The beam is translated and reflected between the paths 171 and 169 that terminate at the cavity terminals 166 and 167 by means of a pair of porro, or roof top prisms which are designated at 172 and 173. These prisms, as seen in the drawings, are spaced apart from the opposite ends 174 and 175 of the laser rod.

Porro prism 172 has a pair of orthogonally arranged planar light reflective surfaces 176 and 177 and a flat planar facial surface portion 178 in the isosceles arrangement. The facial surface 178 is arranged perpendicular to the light path 169 and to the axis of the rod so that beam light along path 169, which is incident to the face 178 enters the prism and at the end 179 of path 159 impinges on and is reflected by the orthogonal surface 176 along a linear light path 180 in the prism. Path 180 is parallel to the prism face 178 and light incident to the prism surface 177 at the end 181 of path 180 is reflected along path 170 and in parallel with the light in path 169.

Figures 13, 14:
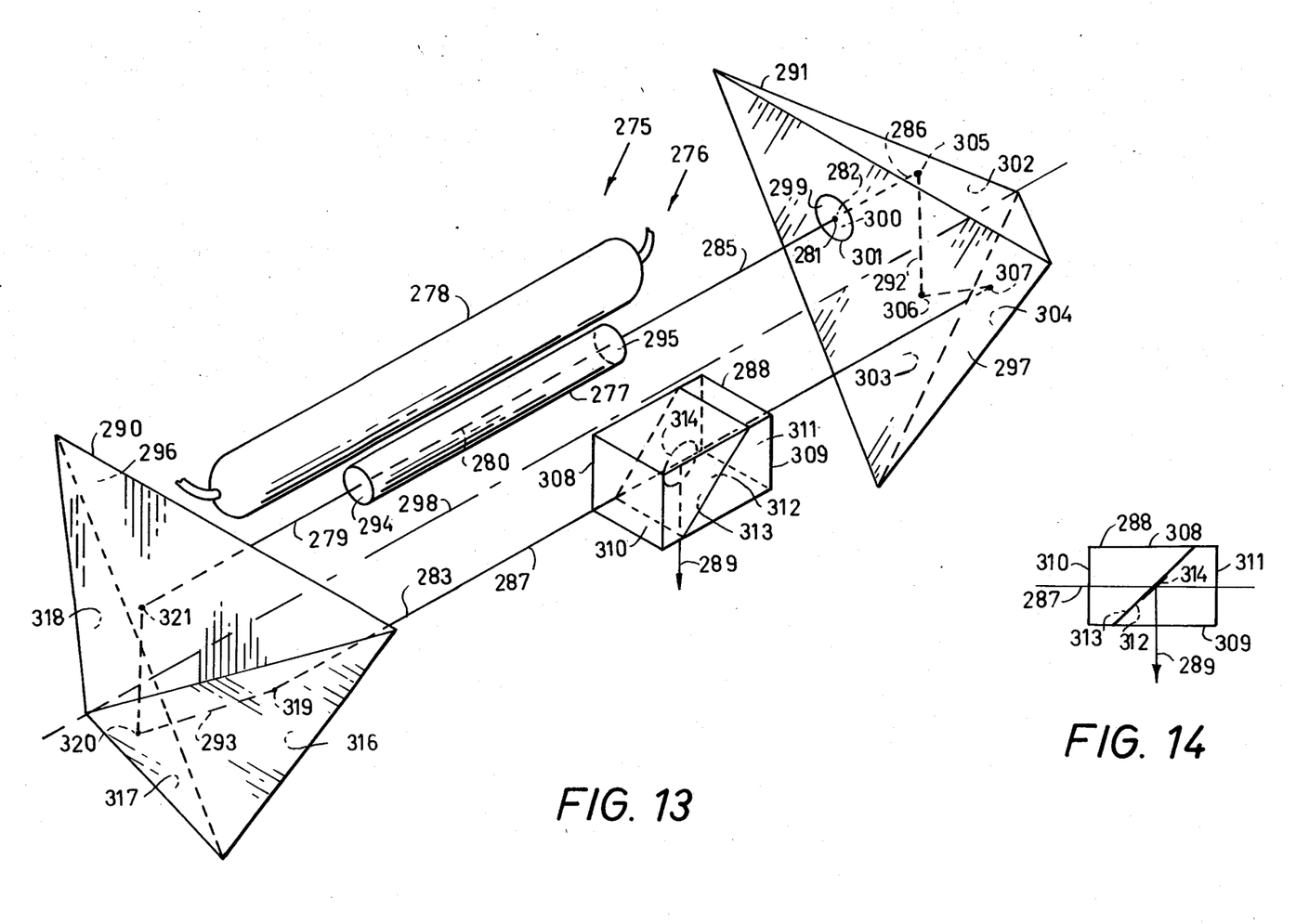
FIG. 13 schematically illustrates yet another embodiment and where a corner prism serves as the base structure for the terminal mirrors.
FIG. 14 schematically illustrated the wedge assembly utilized in the FIGS. 10 and 11 embodiments.

The base component of the pick-off mirror for the resonator is shown in the form of a wedge member that is designated at 183. It has a flat planar surface 184 which is inclined to the linear path 170 and provided with a suitable dielectric coating that is fixed to the surface 184 and serves to laterally reflect a portion of the beam light as the laser beam output 186. The wedge 183 of the pick-off mirror is transparent and preferably formed from a suitable quartz or other light transmitting material. To avoid beam refraction and non-linearity in the path 170 traversed between the prisms 173 and 172, a compensating wedge 187 made of like transparent material is provided. Wedge 187 has an inclined surface 188 that confronts the inclined surface 184 of member 183 in the assembled arrangement and is contiguous with the coating on surface 184. At the opposite ends of the wedge assembly, the wedge members 183 and 187 have flat plane surface portions 189 and 190. These surfaces are normal or perpendicular to the light path 170 so that refraction of light at the surfaces 189 and 190 is avoided and light reflected by the prism 172 along path 170 traverses a linear route to prism 173.

Prism 173 is also a porro prism and has orthogonally arranged planar light reflective surfaces 191 and 192, as well as a flat planar facial surface portion 193 in the isosceles arrangement. The face 193 of prism 173 is perpendicular to path 170 and parallel to the face 178 of prism 172. Beam light along path 170 that is incident to the normally arranged face 193 of the prism enters the prism and, at the end 194 of path 170, is reflected along the linear path 195 through the prism 173. At the other end 196 of path 195, light incident to the orthogonally arranged surface 192 is reflected toward the rod 162 along path 171 and, after emerging from the prism face 193, is reflected at the cavity end terminal 166 to again traverse the paths 171, 195, 170, 180 and 169 back to the other end terminal 167.

At the opposite ends 174 and 175 of the rod, the rod 162 is equipped with planar exterior surface portions 197 and 198. These surfaces are parallel to each other and to the faces 178 and 193 of the prisms, and hence are normal to the coaxial paths 171 and 169. The arrangement at end 175 permits the beam light along path 169 to enter or exit the end 175 without refraction. This rod end 175 can, of course, be provided with an inclined surface and a compensating wedge component if avoidance of the etalon effect is desired.

The end terminals 166 and 167 in this embodiment are formed by oppositely facing reflective or mirror surfaces 199 and 200 that are provided by a coating 201 of suitable light reflective material that is applied and fixed to the end surface 197 of rod 162. In this arrangement of the coating, surface 200 confronts the planar end surface 199 of the rod and the surfaces 199 and 200 are also normal to the light paths 171 and 169. The paths 171 and 169 accordingly extend in opposite directions from the end surface portion 201 of rod 162 with the beam light generated along the rod axis and incident to surface 200 being reflected toward prism 172 along the path 169 through the rod 162 while beam light incident to surface 199 is reflected back along path 171.

In this arrangement, the laser rod provides the rigid unitary structure for the coating that forms and defines the end terminals and has the advantage that proper orientation of the rod in the resonator arrangement serves to automatically arrange the terminal mirrors in the laser device.

Figure 11:
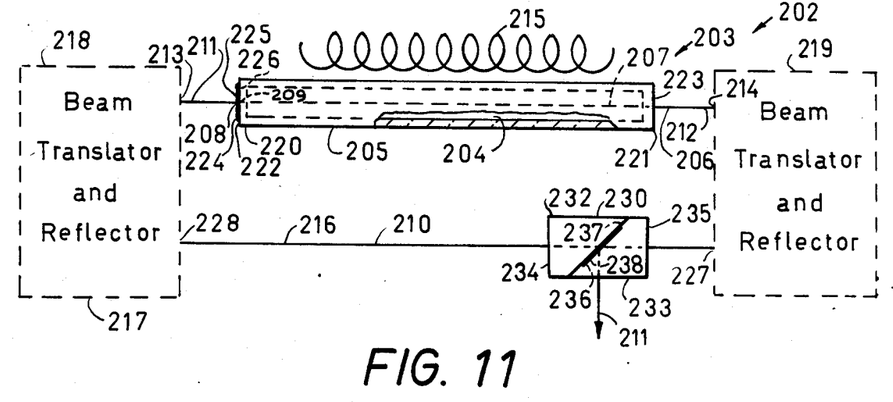
FIG. 11 schematically illustrates yet another embodiment and where the base structure for the terminal mirrors is provided by an envelope for a gas lasing medium.

FIG. 11 schematically illustrates an arrangement in a laser device and in which the envelope for a fluid lasing medium constitutes the rigid unitary base structure for the cavity end terminal mirrors.

The lasing device 202 shown in FIG. 11 has a resonator 203 which includes a fluid lasing medium 204 that is shown in the form of a He-Ne gas lasing medium. The medium 204 is housed in an elongated hollow envelope 205 made from transparent material, such as a suitable quartz glass. The means for pumping energy into the medium is shown in the form of an R-F coil 215 that serves, when energized, to establish the population inversion that causes the lasing action. The lasing action develops a beam 206 along the axis 207 of the envelope and which resonates back and forth between the opposite end terminals 208 and 209 of the resonator cavity or light path 210.

The cavity 210 includes coaxial linear light paths 211 and 212 which terminate at the terminals 208 and 209. At the other ends 213 and 214 of the paths 211 and 212, suitable means 217 is provided for translating and reflecting the beam light along a linear light path 216 which is laterally offset from and in parallel with the light paths 211 and 212 that terminate at the end surface 222 of the envelope.

The translating and reflecting means 217 may be formed by any suitable optical system such as a pair of mirror clusters or prisms having appropriately arranged reflective surfaces. In the illustration depicted, the means 217 is shown as having spaced apart translator and reflector components 217 and 218. Each of these components may be formed by a corner prism or by three orthogonally arranged mirrors in a mirror cluster. Component 218 serves to translate and reflect the laser beam between offset and parallel light paths 211 and 216 while component 219 serves to translate the beam between paths 212 and 216.

The housing envelope 205 for the gas lasing medium 204 has opposite ends 220 and 221, and the envelope is equipped with planar exterior surface portions 222 and 223 at these opposite ends 220 and 221. Surface 223 is normal to path 212 so that refraction is avoided during the light passage through the surface. Surface 222 is parallel to the surface 223 and hence, normal to the light paths that terminate at the end surface 222. The envelope 205 has a uniform thickness at its opposite ends 221 to provide interior end surfaces in the envelope that are normal to path 212 and to thus avoid refraction as the light passes between the medium and end walls at the interior of the envelope.

The end terminals are formed by a mirror surface forming coating 224 that is fixed to the planar end surface 222 of envelope 205. The coating may be formed by any suitable material, such as by one or more of the dielectric coating materials commonly used in laser applications for such purposes. The coating 224 provides oppositely facing mirror surfaces 225 and 226 that respectively define and form the end terminals 208 and 209, and, in the arrangement surface 226 confronts the planar end surface 222 of the envelope.

Paths 211 and 212 extend in opposite directions that are normal to the end surface 222 of the envelope, and in operation, beam light produced along the axis 207 of the envelope 205 which is incident to the mirror surface 226 is reflected back from the cavity terminal 209 and along the path 212 through the lasing medium. At the end 214 of the path, the beam light is translated and reflected by component 219 into path 216. As the light passes from one end 227 of path 216 to the other end 228, it encounters the output beam pick-off assembly 230 and a portion of the beam is laterally reflected as the laser rod output beam 231.

Assembly 230 is like that described in the previous embodiment, and has a pair of transparent wedge members 232 and 233 that are made from like materials and respectively provided with planar facial surface portions 234 and 235. These surface portions are arranged normal to the light path 216 to avoid refraction. The wedges 232 and 233 have confronting planar surface portions 236 and 237 that are inclined to the light path 216, and wedge 232 has a suitable reflective coating 238 that is fixed to surface 236. This coating 238 serves to laterally reflect a portion of the incident light as the laser output and pass the balance of the light along the path 216 to the translating and reflecting component 218.

At the end 228 of path 216, component 218 serves to translate and reflect the light incident to the component into path 211. This light is transmitted along the path to surface 225 and at the cavity terminal 208 is reflected by the surface back along the path 211. The light incident to component 218 at the path end 213 is again translated and traverses paths 216 and 212 through the opposite end terminal 209. As the beam traverses the path 212 through the medium, further emission is, of course, stimulated.

In this arrangement, the laser envelope provides the rigid unitary structure for the coating that forms and defines the end terminals and again has the advantage that proper orientation of the laser envelope in the resonator arrangement serves to automatically arrange the terminal mirror without the need for separate means for facilitating the adjustments and maintenance of the proper orientations.

Figure 12:
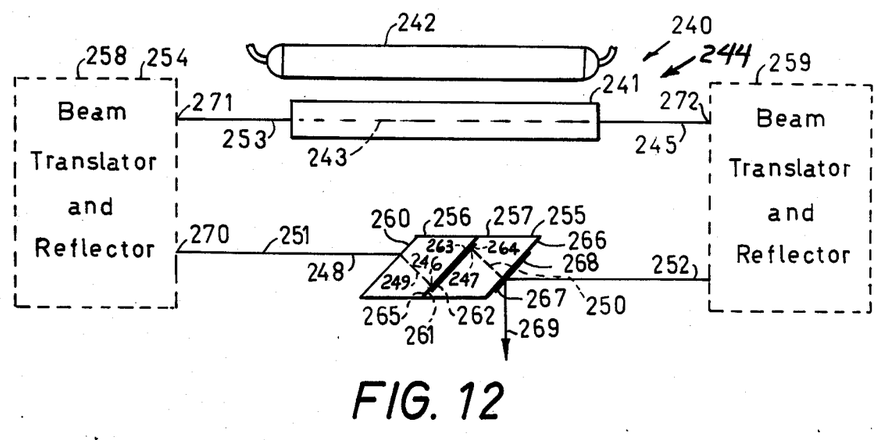
FIG. 12 schematically illustrates another embodiment and where the base structure for the terminal mirror surfaces also serves as the base structure for the pick-off mirror.

FIG. 12 illustrates an arrangement in which the rigid base component for the terminal mirrors is provided in an assembly that establishes offset and parallel light paths at the cavity terminals and also provides the output beam for the laser device.

The laser device 240 has a resonator 244 which includes an elongated cylindrical YAG rod 241. Rod 241 provides a source of lasing medium, and the pumping of the medium is accomplished by energizing an elongated krypton lamp 242. The beam 245 developed by the lasing action is propagated along the rod axis 243 and resonates back and forth between the end terminals 246 and 247 of the resonator cavity or light path 248.

The cavity path 248 includes parallel linear light paths 249 and 250 in the terminal forming and light pick-off assembly 255. It also includes parallel linear light paths 251 and 252 and a linear light path 253 which is offset and parallel with paths 251 and 252. Path 253 extends through the laser rod 241 and is coaxial with the axis of the rod.

The means 254 for translating and reflecting the beam 245 between the light paths 249 and 250 that terminate at the cavity terminals includes an assembly 255 of transparent wedge members 256 and 257 and a pair of beam translating and reflecting components 258 and 259. Component 258 serves to translate and reflect the laser beam 245 between linear light paths 251 and 253. It may take the form of any suitable optical system providing the desired translation. A corner or porro prism that is appropriately arranged may be used as well as a mirror cluster having a reflective surface arrangement that is comparable to either of the aforementioned prisms. Component 259 serves to translate and reflect the laser beam 254 between linear light paths 252 and 245 and may also take the form of one of the arrangements contemplated for component 258.

The wedge assembly 255 includes transparent wedge members 256 and 257. In this embodiment, wedge member 255 consititutes the rigid unitary base component for the end terminal forming mirror coating and it has oppositely facing planar exterior end surface portions 260 and 261. These surfaces 260 and 261 are parallel and inclined to light path 251 so that the light is refracted in passing between paths 251 and 249. Surface 261 has a coating 262 of suitable dielectric material that forms the oppositely facing planar light reflective or mirror surfaces 263 and 264 that form and define the end terminals 246 and 247. As the coating 262 is fixed to the member 256, surface 263 confronts the end surface 261. The other wedge member 257 of the assembly 255 also has oppositely facing planar exterior end surface portions 265 and 266. These surfaces 255 and 266 are parallel to each other and are arranged in parallel with surfaces 260 and 261 in the assembly 255. Surface 265 confronts the coated surface 261, and surface 266 is inclined to the light path 252 so that the light is refracted in passing between paths 250 and 252. Member 257 is fixed to member 256 and provides the base for the beam pick-off mirror. Member 257 is provided with a suitable dielectric coating 267 that is fixed to the end surface 266 and the coating serves to laterally reflect a portion of the light incident to the surface 268 as the output beam 269 while passing the balance of the light through the surface 266 and along path 250.

In operation, the beam 245 is generated in the rod 241 and is propagated back and forth between terminals 246 and 247. Light incident to the mirror surface 263 that defines terminal 246 is reflected back along its path 246 of incidence to the surface 263 and at the end surface 260 of wedge 256 is refracted and traverses path 251. At the path end 251, component 258 translates and folds the beam light into path 253. In traversing the path 253 from one end 271 to the other end 272, the beam light reflected at terminal 246 passes through the rod and stimulates further emission. At the path end 272, the incident beam light is translated and reflected by component 259 into path 252. At surface 268, a portion of the incident light is reflected laterally as the output beam 269 while the balance passes through the coating 268 and is refracted at surface 266 for traversal of path 250. At the end terminal 247, the light impinges upon mirror surface 264. Paths 249 and 250 are normal to surface 261 and to the mirror surfaces thereat so that the incident to the terminal mirror surface 264 is reflected back along path 250 and thereafter again traverses paths 252, 253, 251 and 249 to terminal 246 during resonation of the beam.

The embodiment illustrated in FIGS. 13 and 14 shows an arrangement where the rigid unitary base component for the terinal mirrors is provided by a prism component of the beam translation and reflection system.

Here, the laser device 275 has a resonator 276 that includes an elongated YAG rod 277 and an elongated krypton lamp 278 that is used in pumping the medium in generating the laser beam 279. The beam 279 is again developed along the rod axis 280 and resonates back and forth between the opposite end terminals 281 and 282 of the cavity or resonator path 283.

The resonator path 283 includes coaxial linear light paths 285 and 286 and a linear light path 287 which is offset and parallel with the coaxial paths 285 and 286. Path 285 is coaxial with the rod axis 280 and extends through the rod while path 287 extends through a wedge assembly 288 for the output beam 289 pick-off mirror.

The resonator 276 also includes a pair of corner prisms 290 and 291 that are used in translating and reflecting the beam 279 between the paths 285 and 286. Prism 291 constitutes the rigid unitary base for the terminal mirrors and also serves to translate and reflect the beam 279 along a path 292 between paths 286 and 287. Prism 290, on the other hand, provides the means for translating and reflecting the beam 279 between paths 285 and 287, as along the path 293 within the prism.

The rod 277 has planar exterior opposite end surface portions 294 and 295 that are normal to path 285 so as to avoid refraction of the beam along the path, and the prisms 290 and 291 are offset from the opposite ends of the rod. These prisms 290 and 291 are so arranged that their planar exterior facial surface portions 296 and 297 are parallel with each other and with the end surfaces of the rod. The prisms are also arranged so that their axis 298 are coaxial and offset from the rod axis 280 so as to facilitate a translation of the beam along the path that is offset from that through the laser rod.

The reflective mirror surfaces 299 and 300 which form and define the end terminals 281 and 282 are formed by means of a suitable dielectric coating 301 that is fixed to face 297 of prims 291. These coating surfaces 299 and 300 face in opposite directions and surface 300 facially confronts and is contiguous with the prism face 297. Surfaces 299 and 300 are, of course, also normal to the light paths 285 and 286 so that these paths extend in opposite directions from the face 297 of the prism 291.

Prism 291 has three orthogonally arranged planar light reflective surfaces 302, 303 and 304. As such, light at the end 305 of path 286 which is incident to surface 302 is reflected along path 292 and impinges upon surface 303 as at 306. Here, the incident light is reflected toward surface 304 and at the end 307 of the path 292 is reflected to emerge from the prism face 297 along path 287.

The wedge assembly 288 is like those utilized in the embodiment seen in FIGS. 10 and 11. It includes a pair of wedge members 308 and 309 that are made from like transparent materials such as quartz and are provided with planar exterior end surface portions 310 and 311. These surfaces 310 and 311 in the assembly are parallel and are arranged normal to the light path 287 so that refraction is avoided as the light passes through the surfaces. The wedge members 308 and 309 are also provided with inclined surfaces 312 and 313 that are arranged to facially confront in the assembly, and surface 312 is equipped with a suitable dielectric coating 314 that serves to laterally reflect a portion of the beam light incident to the surface 312 as the output beam 289 while passing the balance of the light along the path 287. The wedges 308 and 309 are suitably fixed together in the assembly and the parallel end surfaces 310 and 311 are also parallel with the prism faces 296 and 297.

Corner prism 290 also has three orthogoanlly arranged light reflective planar surface portions 316, 317 and 318. Light that passes through the pick-off mirror assembly 288 and is incident to the prism face 296 enters the prism and, at the end 319 of the path 287, impinges upon surface 316 and is reflected along path 293. In traversing the path 293, the light reflected by surface 316 impinges upon surface 317, as at 320, and at the end 321 of path 293 impinges on surface 318. Here, the light is reflected along path 285 to traverse the rod 277 and thereafter impinge upon the mirror surface 299 at the other end terminal 281 of the cavity. Here, of course, the beam light incident to surface 299 is reflected back along path 285 to thereafter traverse the paths 293, 287, 292 and 286 to the other end terminal 282 during the resonating process. With each traverse of the rod, the beam light, of course, stimulates further photon beam emission during the resonating process.

From a consideration of the foregoing embodiments, it is evident that many of the alignment problems heretofore associated with the use of structurally separated end terminal forming mirror components, in laser applications, can be resolved by embodying the end terminal forming and defining mirrors in a single rigid unitary structure and by simply translating and reflecting laser beam along light paths that terminate at the respective mirrors. As evident from the various embodiments previously considered, not only may the alignment problems associated with separate terminal mirrors be diminished by incorporating the mirrors in a single unitary rigid component, but the rigid component may be provided by other rigid unitary structural members which are used in the resonator and must also be appropriately aligned. Thus, the base for the terminal mirrors may be provided by a prism used in the beam translation or by a laser rod or envelope for a gaseous lasing medium by a simple wedging component used in the laser application.

As far as the translation of the laser beam from the path traversed through the laser medium is concerned, such translation and reflection is preferably found on the use of one or more corner prisms or an equivalent three-mirror cluster arrangement for each prism because of their prism or cluster characteristics that provide for parallel light paths over substantial variations in the angles of incidence to the reflective surfaces. Thus, through the use of such optical components, initial alignment of the resonator components need merely fall within the tolerances permitted by the prism or cluster arrangement as opposed to the precise alignments otherwise required with other beam translation components.

While only certain preferred embodiments of this invention have been shown and described by way of illustration, many modifications will occur to those skilled in the art and it is, therefore, desired that it be understood that it is intended herein to cover all such modifications that fall within the true spirit of this invention.

I claim:

1. In a laser device having a laser beam resonator with a folded optical cavity that has opposite end terminals and a pair of linear light paths that respectively terminate at said opposite end terminals, the improvement comprising light translating and reflecting means arranged to continuously translate and reflect the laser beam between said pair of linear light paths and including a corner reflector, a rigid unitary mirror base component having a surface, and mirror surface forming means fixed to the surface of said mirror base component and thereat arranged to form and define said opposite end terminals.

2. In a laser device having a laser beam resonator with a folded optical cavity that has opposite end terminals and a pair of linear light paths that respectively terminate at said opposite end terminals, the improvement in accord with claim 1 wherein the surface of said mirror base component includes a planar surface portion, and wherein said mirror surface forming means is fixed to said planar surface portion and thereat arranged to form and define said opposite end terminals.

3. In a laser device having a laser beam resonator with a folded optical cavity that has opposite end terminals and a pair of linear light paths that respectively terminate at said opposite end terminals, the improvement comprising light translating and reflecting means arranged to continuously translate and reflect the laser beam between said pair of linear light paths, a rigid unitary mirror base component having a surface, and mirror surface forming means fixed to the surface of said mirror base component, the surface of said mirror base component including oppositely facing surface portions, and said mirror surface forming means being fixed to each of said oppositely facing surface portions and thereat arranged to form and define said opposite end terminals respectively.

4. In a laser device having a laser beam resonator with a folded optical cavity that has opposite end terminals and a pair of linear light paths that respectively terminate at said opposite end terminals, the improvement comprising light translating and reflecting means arranged to continuously translate and reflect the laser beam between said pair of linear light paths, a rigid unitary mirror base component having a surface, and mirror surface forming means fixed to the surface of said mirror base component and thereat arranged to form and define said opposite end terminals, said rigid unitary mirror base component being a solid state laser rod.

5. In a laser device having a laser beam resonator with a folded optical cavity that has opposite end terminals and a pair of linear light paths that respectively terminate at said opposite end terminals, the improvement in accord with claim 4 wherein said solid state laser rod has opposite ends and an end surface that is located at one of said opposite ends and constitutes a portion of the surface of said mirror base component, and wherein said mirror surface forming means is fixed to said end surface and thereat arranged to form and define said opposite end terminals.

6. In a laser device having a laser resonator with a folded optical cavity that has opposite end terminals and a pair of linear light paths that respectively terminate at said opposite end terminals, the improvement comprising light translating and reflecting means arranged to continuously translate and reflect the laser beam between said pair of linear light paths, a rigid unitary mirror base component having a surface, and mirror surface forming means fixed to the surface of said mirror base component and thereat arranged to form and define said opposite end terminals, said rigid unitary mirror base component being an envelope for housing a fluid lasing medium.

7. In a laser device having a laser beam resonator with a folded optical cavity that has opposite end terminals and a pair of linear light paths that respectively terminate at said opposite end terminals, the improvement in accord with claim 6 wherein said envelope has opposite ends and an end surface that is located at one of said opposite ends and constitutes a portion of the surface of said mirror base component, and wherein said mirror surface forming means is fixed to said end surface and thereat arranged to form and define said opposite end terminals.

8. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement comprising light translating and reflecting means arranged to continuously translate and reflect the laser beam between said pair of linear light paths and including a corner reflector, a rigid unitary mirror base component having a surface, and mirror surface forming means fixed to the surface of said mirror base component and thereat arranged to form and define said opposite end terminals.

9. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 8 wherein said light translating and reflecting means includes a prism.

10. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 9 wherein said prism is a corner prism.

11. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 8 wherein said light translating and reflecting means includes a pair of prisms.

12. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 8 wherein said rigid unitary mirror base component is formed from light transmittable material, and wherein one of said linear light paths extends through said light transmittable material.

13. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement comprising light translating and reflecting means arranged to continuously translate and reflect the laser beam between said pair of linear light paths and including a prism, a rigid unitary mirror base component having a surface, and mirror surface forming means fixed to the surface of said mirror base component, said rigid unitary mirror base component being said prism, said prism having a facial surface that constitutes a portion of the surface of said mirror base component, and said mirror surface forming means being fixed to said facial surface and thereat arranged to form and define said opposite end terminals.

14. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement comprising light translating and reflecting means arranged to continuously translate and reflect the laser beam between said pair of linear light paths and including a pair of prisms, a rigid unitary mirror base component having a surface, and mirror surface forming means fixed to the surface of said mirror base component, said rigid unitary mirror base component being one of said prisms, said one of said prisms having a facial surface constituting a portion of the surface of said mirror base component, and said mirror surface forming means being fixed to said facial surface and thereat arranged to form and define said opposite end terminals.

15. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 14 wherein said one of said prisms is a corner prism.

16. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement comprising light translating and reflecting means arranged to continuously translate and reflect the laser beam between said pair of linear light paths, a rigid unitary mirror base component that is formed of light transmittable material and has a surface, and mirror surface forming means fixed to the surface of said mirror base component, said mirror surface forming means having oppositely facing mirror surface portions that respectively form and define said opposite end terminals, one of said oppositely facing mirror surface portions being arranged to facially confront the surface of said mirror base component, and said rigid unitary base component being arranged so that one of said linear light paths extends through the light transmittable material thereof.

17. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 16 wherein said light translating and reflecting means includes a prism, wherein said rigid unitary mirror base component is said prism, wherein said prism has a facial surface that constitutes a portion of the surface of said mirror base component, and wherein said one of said oppositely facing mirror surface portions facially confronts the facial surface of said prism.

18. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 16 wherein said rigid unitary mirror base component is a solid state laser rod that includes said lasing medium, wherein said laser rod has opposite ends and an end surface that is located at one of said opposite ends and constitutes a portion of the surface of said mirror base component, and wherein said one of said oppositely facing mirror surface portions facially confronts the end surface of said laser rod.

19. In a laser device having a laser beam resonator with a folded optical cavity that has opposite end terminals and a pair of linear light paths that respectively terminate at said opposite end terminals, a lasing medium arranged in the cavity, and means for pumping energy into the medium to provide a laser beam in the cavity, the improvement in accord with claim 16 wherein said lasing medium is a fluid lasing medium, wherein said rigid unitary mirror base component is an envelope that houses said fluid medium, wherein said envelope has opposite ends and an end surface that is located at one of said opposite ends and constitutes a portion of the surface of said mirror base component, and wherein said one of said oppositely facing mirror surface portions facially confronts the end surface of said envelope.

20. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement comprising light translating and reflecting means arranged to continuously translate and reflect the laser beam between said pair of linear light paths including a corner reflector, a rigid unitary mirror base component having a planar surface portion, and mirror surface forming means fixed to said planar surface portion and thereat arranged to form and define said opposite end terminals.

21. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 20 wherein said pair of linear light paths are parallel to each other and normal to said planar surface portion of said mirror base component.

22. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 21 wherein said pair of linear light paths terminate at said planar surface portion of said mirror base component.

23. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 22 wherein said pair of linear light paths are laterally offset from each other.

24. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 22 wherein said pair of linear light paths extend in opposite directions from the planar surface portion of said mirror base component.

25. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 20 wherein said corner reflector is arranged to continuously translate and reflect the laser beam between a parallel and laterally offset pair of said plurality of linear light paths.

26. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 25 wherein said parallel and laterally offset pair of said plurality of linear light paths includes a light path extending through said lasing medium.

27. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 26 wherein said corner reflector is a corner prism.

28. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement comprising light translating and reflecting means arranged to continuously translate and reflect the laser beam between said pair of linear light paths, a rigid unitary mirror base component having a planar surface portion, and mirror surface forming means fixed to said planar surface portion and thereat arranged to form and define said opposite end terminals, said light translating and reflecting means including a corner prism for translating and reflecting the laser beam between a pair of said plurality of light paths which are laterally offset from and parallel to each other and include a light path that extends through said lasing medium.

29. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 28 wherein said corner prism has a plane facial surface, and wherein said mirror surface forming means has spaced apart mirror surface portions which respectively form and define said opposite end terminals and which generally face in a common direction toward said plane facial surface.

30. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement comprising light translating and reflecting means arranged to continuously translate and reflect the laser beam between said pair of linear light paths including a prism for translating and reflecting the laser beam between a pair of said plurality of light paths which are laterally offset from and parallel to each other and include a light path that extends through said lasing medium, a rigid unitary mirror base component having a planar surface portion, and mirror surface forming means fixed to said planar surface portion and thereat arranged to form and define said opposite end terminals, said mirror surface forming means having oppositely facing mirror surface portions which respectively form and define said opposite end terminals.

31. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 30 wherein said rigid unitary base component is a solid state laser rod which includes said lasing medium, wherein said laser rod has an end surface that constitutes the planar surface portion of said mirror base component, and wherein one of said oppositely facing mirror surface portions of said mirror surface forming means facially confronts the end surface of said laser rod.

32. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 30 wherein said lasing medium is fluid, wherein said rigid unitary base component is an envelope for housing the fluid lasing medium, wherein said envelope has an end surface that constitutes the planar surface portion of said mirror base component, and wherein one of said oppositely facing mirror surface portions of said mirror surface forming means facially confronts the end surface of said envelope.

33. In a laser device having a laser beam resonator with a folded optical cavity that has opposite end terminals and a plurality of linear light paths therebetween which include a pair of linear light paths that respectively terminate at said opposite end terminals, a lasing medium arranged in the cavity, and means for pumping energy into the medium to provide a laser beam in the cavity, the improvement in accord with claim 30 wherein said rigid unitary mirror base component is said prism, and wherein said prism has a plane facial surface that constitutes said planar surface portion.

34. In a laser device having a laser beam resonator with a folded optical cavity that has opposite end terminals and a plurality of linear light paths therebetween which include a pair of linear light paths that respectively terminate at said opposite end terminals, the improvement comprising light translating and reflecting means arranged to continuously translate and reflect the laser beam between said pair of linear light paths including a corner reflector, a rigid unitary mirror base component having a surface, and coating means fixed to the surface of said mirror base component and having spaced apart mirror surfaces that respectively define and form said opposite end terminals.

35. In a laser device having a laser beam resonator with a folded optical cavity that has opposite end terminals and a plurality of linear light paths therebetween which include a pair of linear light paths that respectively terminate at said opposite end terminals, the improvement in accord with claim 34 wherein said corner reflector is a corner prism having a plane facial surface which is arranged in the light path of at least one of the pair of linear light paths that terminate at said opposite end terminals.

36. In a laser device having a laser beam resonator with a folded optical cavity that has opposite end terminals and a plurality of linear light paths therebetween which include a pair of linear light paths that respectively terminate at said opposite end terminals, the improvement in accord with claim 35 which further comprises an elongated laser rod, and wherein said one of the pair of linear light paths extends through said laser rod.

37. In a laser device having a laser beam resonator with a folded optical cavity that has opposite end terminals and a plurality of linear light paths therebetween which include a pair of linear light paths that respectively terminate at said opposite end terminals, the improvement in accord with claim 34 wherein said corner reflector is a corner prism which is arranged to continuously translate and reflect the laser beam between another pair of said plurality of linear light paths.

38. In a laser device having a laser beam resonator with a folded optical cavity that has opposite end terminals and a pair of linear light paths that terminate at said opposite end terminals, the improvement comprising light translating and reflecting means arranged to continuously translate and reflect the laser beam between said pair of linear light paths, a rigid unitary mirror base component made from light transmittable material and having a surface, and coating means fixed to the surface of said mirror base component and having oppositely facing mirror surface portions that respectively form and define said opposite end terminals.

39. In a laser device having a laser beam resonator with a folded optical cavity that has opposite end terminals and a pair of linear light paths that terminate at said opposite end terminals, the improvement in accord with claim 38 wherein said light translating and reflecting means comprises a prism and wherein said mirror base component is said prism.

40. In a laser device having a laser beam resonator with a folded optical cavity that has opposite end terminals and a pair of linear light paths that terminate at said opposite end terminals, the improvement in accord with claim 38 which further comprises a solid state laser rod and wherein said mirror base component is said solid state laser rod.

41. In a laser device having a laser beam resonator with a folded optical cavity that has opposite end terminals and a pair of linear light paths that terminate at said opposite end terminals, the improvement in accord with claim 40 wherein said light translating and reflecting means comprises a porro prism.

42. In a laser device having a laser beam resonator with a folded optical cavity that has opposite end terminals and a pair of linear light paths that terminate at said opposite end terminals, the improvement in accord with claim 38 which further comprises an envelope for a fluid lasing medium and wherein said mirror base component is said envelope.

* * * * *